United States Patent [19]

Blattner et al.

[11] 3,892,965

[45] July 1, 1975

[54] MARKING METHOD AND DEVICE

[75] Inventors: Karl Blattner, Rain 698, Kuttigen; Roland Picard, Sonnmattstrasse, 923, Romback, both of Switzerland

[73] Assignee: Societe Genevoise d'Instruments de Physique, Geneva, Switzerland

[22] Filed: Sept. 25, 1973

[21] Appl. No.: 400,529

[30] Foreign Application Priority Data

Nov. 16, 1972 Switzerland ........................ 16713/72

[52] U.S. Cl. ................................ 250/316; 346/76 R

[51] Int. Cl.$^2$ ............................................ G03C 5/16

[58] Field of Search .............. 33/1 C, 1 M; 250/316; 346/76 R

[56] References Cited

UNITED STATES PATENTS

| | | | |
|---|---|---|---|
| 2,713,822 | 7/1955 | Newman | 346/76 |
| 3,237,511 | 3/1966 | Helava | 33/1 |
| 3,335,287 | 8/1967 | Hargens | 33/1 |
| 3,474,457 | 10/1969 | Becker | 250/316 |
| 3,512,158 | 5/1970 | Scarbrough | 250/316 |
| 3,623,229 | 11/1971 | Caldwell | 33/1 |

*Primary Examiner*—James W. Lawrence
*Assistant Examiner*—B. C. Anderson
*Attorney, Agent, or Firm*—Young & Thompson

[57] ABSTRACT

The invention relates to a method of marking the positions on a drawing, which have been referenced and recorded by means of a coordinate reading device as well as to a device for marking said positions.

The invention provides for the placing of a heat-sensitive sheet upon the sheet on which the drawing is carried and the projection of the image of an infra-red source onto said sheet, on a point on the drawing which is to be recorded. This projection is done simultaneously with the recording of the point by the coordinate reading device and a local modification of the visual condition of the heat-sensitive sheet is obtained.

5 Claims, 7 Drawing Figures

MARKING METHOD AND DEVICE

Figure 1:
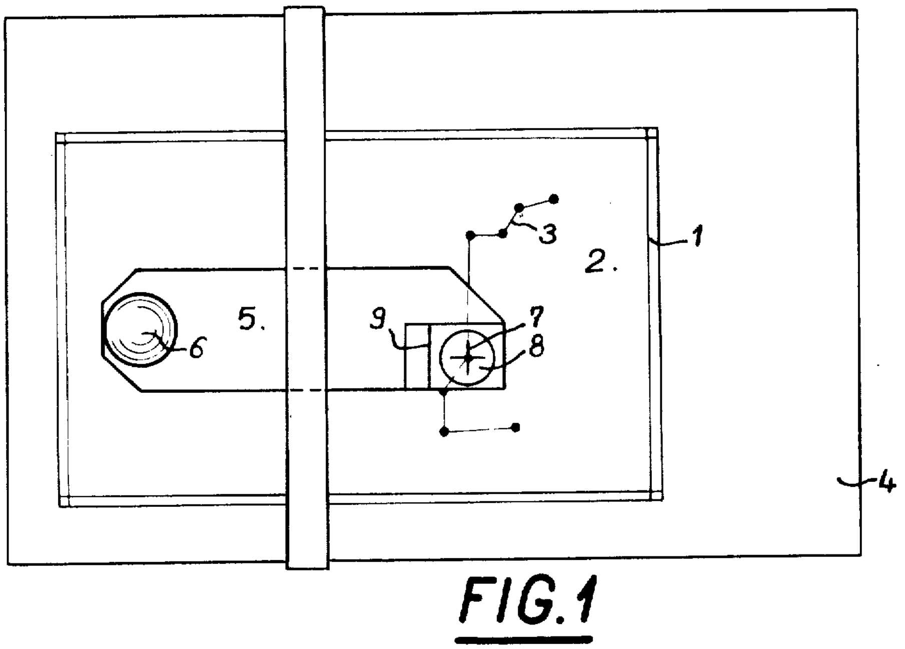

Establishing and recording coordinates on drawings, sketches or diagrams, for the transcription thereof in plain language or in table form, for making on punched or magnetic tapes, or for use thereof as a control element for computers or machine tools, in the broadest sense, is most often effected by means of a coordinate reading device.

The operator of such a device must position a reference marker carried by the movable member, opposite the points on the drawing which are to be recorded, and then cause the coordinates of that point to be recorded by actuating a switch, which is generally coupled to a control pedal.

As points which have already been recorded are in most cases marked manually, it is necessary for the operator to move the movable member of the reading device to enable him to carry out the point marking operation. This movement, which is not a useful movement as regards the desired function of the movable member of the reading device, causes an increase in the non-productive working time and reduction in the life of the reading device.

The dangers of human error are particularly high when the operator is disturbed in his work and cannot reproduce a drawing in a single operation without interruption.

When the drawings to be reproduced are complicated and comprise a large number of points to be recorded, as may be the case in the production of printed circuits, the operator must be extremely attentive in order not to forget points or on the contrary, not to record the same coordinates several times.

The present invention relates to a method for automatically marking the points on a drawing which have been reference marked and recorded by means of a coordinate reading device, characterised in that a heat-sensitive sheet is placed on the sheet on which the drawing is carried, and that the image of an infra-red source is projected onto the heat-sensitive sheet, on a point on the drawing which is to be recorded, when the point is recorded, thereby to produce a local modification of the visual aspect of the heat-sensitive sheet.

The present invention also relates to a marking device for carrying out the method described, which is distinguished in that it comprises a heat-sensitive sheet which is placed on the sheet carrying the drawing, and a projection means for forming the image of an infra-red source on the point indicated by the reference marking member of the coordinate reading device, said projection means being mounted on the movable member of the coordinate reading device and controlled by the member of the reading device which controls the recording of a point indicated by the reference marking member.

The accompanying drawings diagrammatically show by way of example an embodiment of the marking device according to the invention.

Figure 2:
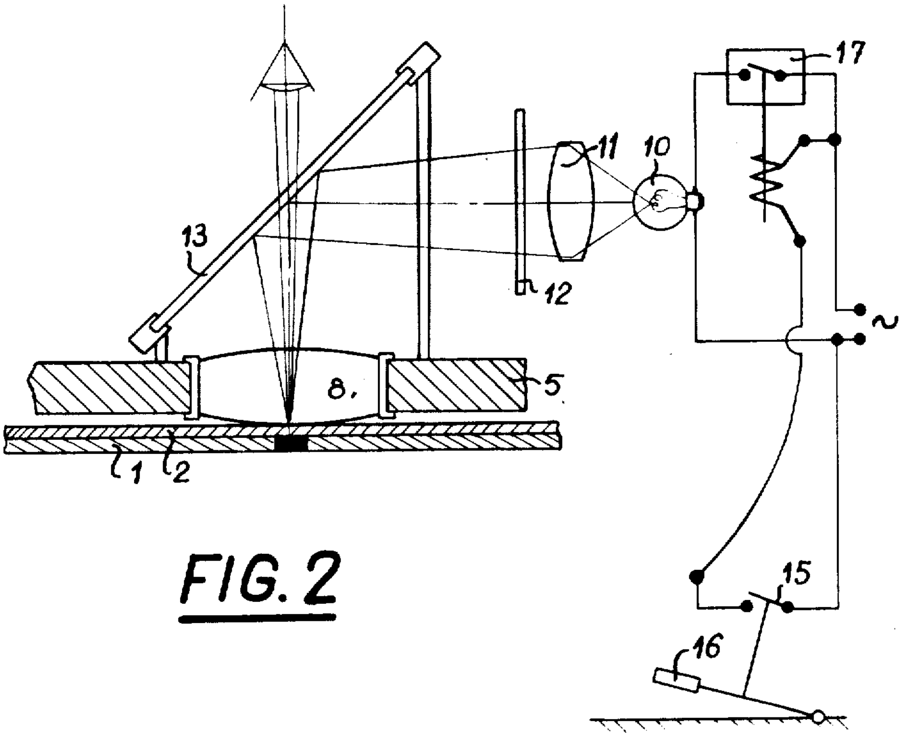
Figure 3:
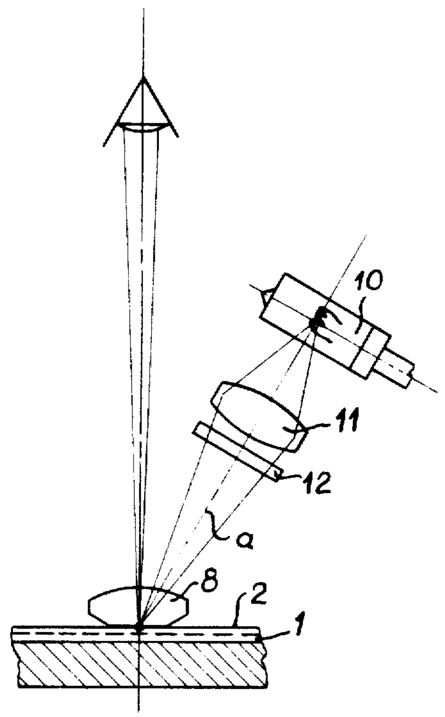
Figure 4:
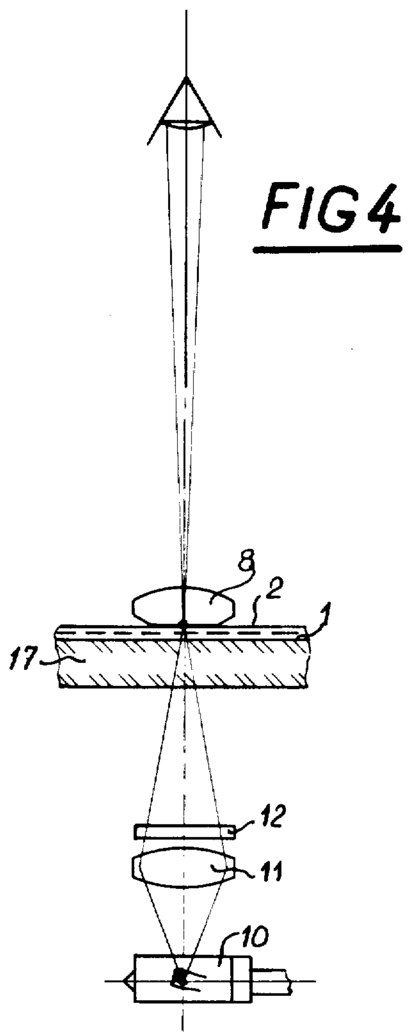
Figures 5A, 5B:
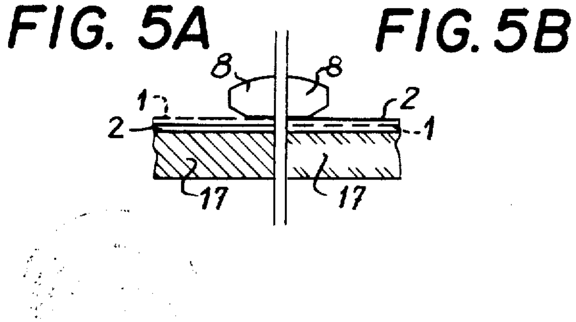
Figure 6:
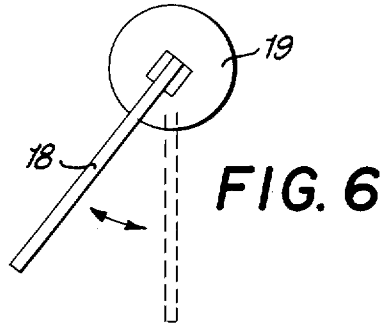

FIG. 1 shows the table of a coordinate reading device, provided with a movable marking member, FIG. 2 shows a view on a larger scale and in cross-section of the projection device, FIGS. 3 and 4 show two alternative forms of the projection device, FIGS. 5A and 5B show a heat-sensitive transparent sheet positioned respectively above and below the sheet bearing the diagram, and FIG. 6 shows a further modified form of projection device.

The marking method comprises positioning a heat-sensitive sheet on the sheet on which the diagram is carried, and making an impression on the heat-sensitive sheet at the position corresponding to a point of the diagram whose coordinates are recorded, simultaneously with said recording operation. In this way the operator can visually discern the points on the diagram which have been recorded, from those which have not yet been recorded. This method eliminates any error comprising forgetting to record a coordinate and recording the same coordinate several times.

The device illustrated, for carrying out the method, comprises a sheet 1 of a heat-sensitive material, for example a heat-sensitive paper, which is positioned below the sheet 2, generally a tracing, on which the diagram 3 is traced. The two sheets 1 and 2 are fixed on the table 4 of a coordinate reading device.

The coordinate reading device comprises, mounted on the table 4, a means which is slidable in the direction of two coordinates and which permits a carrier member 5 to be displaced over the whole of the working surface of the table.

The carrier 5 comprises a gripping member 6 which enables the operator of the device to displace the carrier. The carrier also carries a reference marking member formed by a reticle 7 and an optical observation means 8, the members 7 and 8 being crimped in the carrier 5. In the embodiment illustrated the reticle 7 is engraved on the lower face of a lens forming the optical observation means 8.

The marking device also comprises a projection means which is housed in a casing fixed on the carrier 5. The projection means comprises an infra-red source which is supplied with electrical power by a control circuit (described hereinafter), a condenser 11, and a semi-transparent mirror 13 which passes the beam of infra-red rays 14 through the optical observation means 8 onto the tracing 2 and the heat-sensitive sheet. The infra-red beam 14 is approximately centered on the reticle 7.

In the embodiment illustrated, the infra-red source comprises a glow lamp 10 and a filter 12 which allows only the infra-red rays emitted by the lamp 10 to pass through it.

In addition, the condenser 11 and the optical observation means 8 have characteristics such that the infra-red image of the source 10 is focussed in the plane of the heat-sensitive sheet 1.

Thus, each time that the source 10 is energised, it causes a change in the visual condition, generally a blackening, of the heat-sensitive sheet, at the position of the infra-red image. It should be noted that, by virtue of the infra-red filter 12, the operator sees the image of the source 10 only faintly and is therefore not disturbed in positioning the reticle 7 over the desired point on the diagram.

The control circuit for the source 10 comprises an electric power supply source, a switch means 15 which is normally open and which is actuated by the pedal 16 of the coordinate reading device, for actuating the recording of a pair of coordinates, and a time-delayed relay 17 which is normally closed.

Thus, as soon as the operator causes a pair of coordinates to be recorded by acting on the pedal 16, he will cause the switch 15 to be closed and the source 10 to be lit. To prevent over-exposure of the heat-sensitive sheet 1, or premature ageing of the source 10, the supply of power to the source 10 is interrupted after a given adjustable time, by the opening of the time-delayed relay 17.

The above-described device makes it possible to produce, automatically and simultaneously with the step of recording a pair of coordinates, a visible marking of the point recorded.

FIG. 3 shows an alternative form of the projection means wherein the image of an infra-red source 10 is produced on the heat-sensitive sheet 1 positioned below the sheet 2 carrying the drawing, both sheets being fixed on the table. As in the embodiment already described, the projection means comprises a condenser 11 and an infrared filter 12. The direction of observation and projection are different.

In the embodiment illustrated in FIG. 4, the projection means is positioned below the table 17 which is transparent. The projection means also comprises a source 10, a condenser 11 and an infra-red filter 12.

FIGS. 5A and 5B show two variants. In FIG. 5A the table 17 is not transparent, the sighting device is located above the table and the thermosensitive layer 1, which is transparent, is placed above the drawing 2. In this case the said drawing 2 can be transparent or not.

In FIG. 5B, the table 17 is transparent, the sighting device is located under the table and the thermosensitive layer 1, which is transparent, is located under the drawing 2 which is transparent.

In both said cases the thermosensitive layer 1, which has to be transparent, is located between the drawing 2 and the sighting of projection device.

The modification shown in FIG. 6 consists in replacing the semitransparent mirror 13 by a mirror 18 reflecting 100% of the incident rays. This mirror 18 is fastened on a shaft driven in angular displacements by a rotary actuator 19, said displacements being limited by fixed abutments (not shown).

In full lines the drawing shows the position when the contact 15 is closed, in said position the infra-red rays can reach and print the thermosensitive layer.

The position shown in dotted lines is the one obtained when the contact 15 is open. In this position the operator can see the drawing without having any of the drawbacks due to looking through a semitransparent mirror.

What we claim is:

1. In a method of marking the positions of points on a drawing which are recorded by means of a coordinate reading device, the improvement comprising superposing the drawing and heat-sensitive sheet, the upper of the drawing and sheet being transparent to visible light, and projecting the image of an infra-red source onto the heat-sensitive sheet at a point on the drawing which is recorded when said recording is effected, thereby locally to modify the visual appearance of the heat-sensitive sheet to provide a visible record of the points of the drawing that have been recorded.

2. A method as claimed in claim 1, in which the heat-sensitive sheet is uppermost and the drawing is lowermost.

3. A method as claimed in claim 1, in which the heat-sensitive sheet is lowermost and the drawing is uppermost.

4. A method as claimed in claim 1, and projecting said image on the heat-sensitive sheet from above.

5. A method as claimed in claim 1, and supporting said sheet and drawing on a transparent support, and directing said image onto the heat-sensitive sheet through the transparent support from below.

* * * * *